United States Patent Office 3,824,211
Patented July 16, 1974

3,824,211
POLYESTERS OF 4,4′-HEXAFLUOROISOPROPYL-IDENE DIPHENOL
William W. Howerton, 55 Todmorden Drive, Wallingford, Pa. 19086
No Drawing. Continuation-in-part of application Ser. No. 89,516, Nov. 13, 1970, which is a continuation-in-part of application Ser. No. 612,299, Jan. 26, 1967, both now abandoned. This application July 6, 1972, Ser. No. 269,374
Int. Cl. C08g 17/08
U.S. Cl. 260—47 C    6 Claims

ABSTRACT OF THE DISCLOSURE

Subject disclosure relates to a unique thermally stable polymer that is particularly useful in protective coating compositions and paint systems. The polymer is prepared by an interfacial polymerization process at room temperature wherein hexafluoroacetone Bisphenol A is mixed in one phase and iso and/or terephthaloyl chloride is mixed in the other phase in the presence of a suitable terminator. Various proportions of the hexafluoroacetone Bisphenol A and the phthaloyl chloride are optionally replaced by various specified difunctional intermediates.

---

The invention described herein may be manufactured and used by or for the Government of the United States of America for governmental purposes without the payment of any royalties thereon or therefor.

This is a continuation-in-part of patent application Ser. No. 89,516 filed Nov. 13, 1970, now abandoned, which is a continuation-in-part of application Ser. No. 612,299, filed Jan. 26, 1967, now abandoned.

Presently available polymers exhibit various deficiencies as coatings for modern supersonic types of aircraft. Silicones maintain their integrtiy at high temperatures but require a baking cycle to develop optimum properties. Acrylics are excellent in weathering resistance but are deficient in low temperature performance. Epoxies chalk and yellow during outdoor exposure. Urethanes have utility to only about 350° F. Vinyls exhibit poor resistance to high temperatures and jet lubes. High temperature polymers such as polyimides and polybenzimidazoles discolor and require a baking cycle to develop full properties.

It is therefore a principal object of the invention to provide a novel and improved polyester which withstands severe weathering, repeated exposure to jet lubes and fuels, and extreme temperature variations.

It is a further object of the invention to provide a novel and improved high temperature polyester which is soluble in relatively non-toxic solvents, and may be applied in the form of a spray that dries quickly in air.

It is a further object of the invention to provide a novel and improved use for a polymer as a protective paint material particularly for aerospace vehicles.

Other objects and advantages will appear in the more detailed description set forth hereinbelow, it being understood, however, that this more detailed description is given by way of illustration and explanation only, and not by way of limitation, since various changes therein may be made by those skilled in the art without departing from the scope or spirit of the invention.

In accordance with the invention, a room temperature interfacial polymerization method is used to prepare the improved high molecular weight polymer. The interfacial polymerization process is a polycondensation at room temperature between two fast reacting intermedaites in separate liquid phases. Due to its relatively low temperature of reaction, the resulting polymer is superior in many ways to a melt condensation product in that the possibility of crosslinking and polymer decomposition are reduced.

After many runs of this type were made and the resulting end product polymers were evaluated, it was found that highly satisfactory results were obtained when hexafluoroacetone Bisphenol A and various phthaloyl chlorides were used as intermediates with a thermally stable polymer terminator such as benzoyl chloride. The formula for the reaction when hexafluoroacetone Bisphenol A, isophthaloyl chloride, and terephthaloyl chloride were combined to obtain the improved polyphenylester polymer of the invention, shown without the terminator, is as follows:

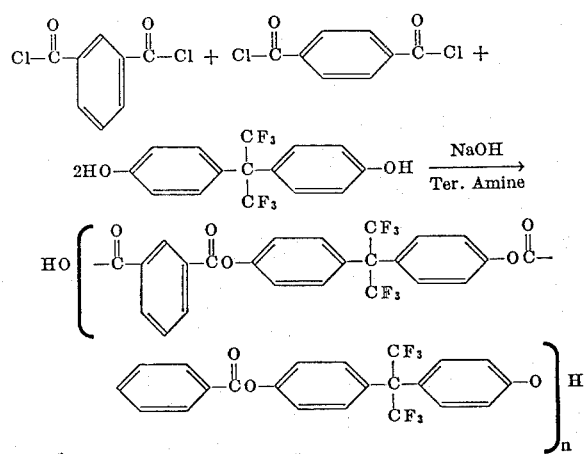

Acid chlorides of other stable structure difunctional intermediates such as 2,6-naphthaloyl chloride, 4,4′-bibenzoyl chloride and oxy 4,4′-dibenzoyl chloride were also used with the hexafluoroacetone Bisphenol A with good results. Best solubility in non-toxic paint solvents such as the aromatics, ketones and esters was obtained when terephthaloyl chloride constitutes somewhat less than 40% of the total acid or phthaloyl chlorides. Varying quantities of the hexafluoroacetone Bisphenol A were also replaced by such intermediates as Bisphenol A, other Bisphenols, 4,4′-dihydroxydiphenyl, 4,4′-dihydroxydiphenyl methane, 4,4′-dihydroxydiphenyl ether and other dihydroxy aromatic compounds with satisfactory results. Superior jet lube resistance was obtained when from 10 to 30% of the hexafluoroacetone Bisphenol A was replaced with Bisphenol A. It was found that monofunctional polymer chain terminators were necessary with these aromatic type polyesters so that the polymers would not degrade with loss of properties over a period of time, while in solution. The preferred coating or paint solvent system contained relatively non-toxic toluene, xylene and anisole. Solvents containing any active hydrogen materials also degraded the polymers.

It was further found that the isothermal high temperature heat resistance of the polymers was significantly improved when terminators were used. Mono-functional polymer chain thermally stable terminating intermediates such as diphenyl carbamoyl chloride, benzoyl chloride, naphthaloyl chloride, ter-butyl phenol, para-phenyl phenol and other functionally similar thermally stable aromatic or heterocyclic monofunctional materials were also used to terminate the polymers.

The resistance of certain of these improved fluoro-Bisphenol A polymers to prolonged exposure at 500° F. and sunlight and weathering resistance, as well as high solubility in non-toxic paint solvents and resistance to deterioration in the presence of jet fuels and lubricants were also found to be particularly useful characteristics when the polymers were used as fibrous materials and films as well as the above mentioned aerospace protective coatings.

Coating polymers with generally typical aircraft paint pigments and fillers, as primers and topcoats, gave good results when tested on aluminum panels for one week in a circulating air oven at 500° F. However, when coatings on titanium and steel were given this same test, they became brittle. It was found that replacement of significant quantities of the pigments and fillers with aluminum hydroxide gave paints which were outstanding on titanium and steel, and also aluminum after the 500° heat test for one week.

The following specific examples of the invention are intended to illustrate the same but not to limit it in any way:

EXAMPLE I

An aromatic saturated linear polyester was made with the following difunctional intermediates, in the molar proportions shown:

25% isophthaloyl chloride
25% terephthaloyl chloride
50% Bisphenol A (BPA)

The acid chlorides were dissolved in an organic phase of methylene chloride, and the Bisphenol A in an aqueous phase containing sufficient sodium hydroxide to form the disodium salt of Bisphenol A. The two phases were then poured along with a slight amount of triethyl amine catalyst, into a household Waring blender, and vigorously agitated for a period of 15 minutes.

The organic phase containing the formed polymer in solution was separated from the aqueous phase, washed several times with water and then was slowly added to vigorously agitated boiling water to coagulate the polymer. The finely divided product was washed several additional times with water to remove residual impurities and then was dried in an oven.

When evaluated, the polymer was insoluble in non-toxic paint solvents, such as toluene, xylene, ketones and esters, but had limited solubility in tetrachloroethane and other chlorinated solvents. After several weeks, however, it was noted that solutions gelled. The tensile strength of cast films was approximately 10,000 p.s.i., and the elongation at break approximately 6%. Coatings, both clear and titanium dioxide pigmented, when applied on aluminum panels and placed in an air circulating oven for one week at 500° F. were slightly brittle and darkened some.

Similar pigmented coatings which were weathered in Florida for a period of three months exhibited some yellowing and chalking.

The polymer was quite tough and abrasion resistant, and had a brittle point somewhat below −65° C.

Coatings showed good resistance to aircraft jet fuels, and also to hot-ester type jet lubricants of the type as specified in Federal Specification MIL-L-23699.

EXAMPLE II

In a manner similar to that used in Example I, a polymer was prepared with the following difunctional intermediates, in the molar proportions shown.

25% isophthaloyl chloride
25% terephthaloyl chloride
50% hexafluoroacetone BPA

The polymer exhibited poor but improved solubility in non-toxic paint solvents such as toluene and xylene solutions gelled after several weeks. Its hot jet lubricant resistance was also poor. Coatings, fibers, films and sheets and other fabricated articles of the polymer did exhibit excellent outdoor weather resistance. Water resistance was also outstanding. Coatings on aluminum panels, both clear and pigmented, exhibited outstanding resistance to discloration when tested in an air circulating oven for one week at 500° F.; however, they were slightly brittle. Pigmented coatings weathered in Florida for three months did not darken or chalk.

EXAMPLE III

A polymer was similarly prepared with the following difunctional intermediates, in the molar proportions shown.

15% terephthaloyl chloride
35% isophthaloyl chloride
50% hexafluoroacetone Bisphenol A The polymer in addition to exhibiting the desirable characteristics of Example II, had excellent solubility in non-toxic paint solvents, such as toluene, xylene, anisole, and the higher molecular weight esters and ketones. A 70/30 toluene/xylene solution did not gel even after one year extended storage at room temperature. Solution viscosities, however, decreased significantly with accelerated storage at 125° F., indicating some degradation of the polymer to a lower molecular weight. In addition, polymer coatings on aluminum panels, although they did not discolor, showed some loss of properties after aging in air for one week at 500° F., particularly a tendency to brittleness. Florida weathering of titanium dioxide pigmented coatings on aluminum panels showed no chalking or discoloration after three months.

Jet lube resistance of coatings was poor.

EXAMPLE IV

The following polymer was prepared by the above described procedure of Example I, using difunctional intermediates in the molar proportions shown below. It will be seen that this polymer was prepared with a terminator, benzoyl chloride.

14.8% terephthaloyl chloride
34.6% isophthaloyl chloride
1.0% benzoyl chloride
49.6% hexafluoroacetone Bisphenol A This polymer exhibited all of the desirable characteristics of the polymer in Example III. The use of the terminator also gave more uniform molecular weight polymer from batch to batch. Unexpectedly and more significantly, polymer solutions were stable after accelerated aging for one month at 125° F., thus making possible the formulation of high temperature polyester coatings and paints which have long shelf life.

Just as significant and unexpected, coatings on aluminum panels were not brittle after aging in air for one week at 500° F., but were almost as tough and flexible as original unaged coatings. Florida weathering of titanium dioxide pigmented coatings on aluminum panels showed no chalking or discoloration after three months.

Isothermal aging data from 450° F. to 650° F. at 50° intervals, between the polymer in Example III (without terminator) and the polymer in this Example IV (with terminator) show percent weight losses, and conclusively demonstrated the advantage of the terminator on high temperature stability for this type of polymer. These data were obtained on a DuPont thermogravimetric analyzer and are given below.

ISOTHERMAL HEAT TESTS

| | Percent weight loss after six hour heating in air | |
|---|---|---|
| | Example III | Example IV |
| Temperature: | | |
| 450° F | 0.4 | 0.3 |
| 500° F | 0.7 | 0.4 |
| 550° F | 2.4 | 1.2 |
| 600° F | 8.5 | 4.2 |
| 650° F | 13.7 | 7.7 |

Chemically effective amounts of the benzoyl chloride terminator were used up to a maximum of two molar percent and similarly, chemically effective amounts of other terminators up to two molar percent were used with equally good results as above. These included naphthaloyl chloride, diphenyl carbamoyl chloride, para phenyl phenol tertiary butyl phenol and other thermally stable aromatic and heterocyclic mono-functional materials that are functional to or react with the end acid groups or end phenolic groups of the polymer. All of the thermally stable polymer terminators which react with the end groups of this type of polymer which we tried were effective to give polymer solution stability and improved long range high temperature stability. Thus, it was apparent that all terminators of this type are effective to give this type polymer solution stability and long range high temperature stability. Similarly, aliphatic mono-functional terminators gave solution stability to this type polymer, but did not improve long range high temperature polymer stability because of their lack of structural stability equivalent to aromatic and heterocyclic structures. Thus, it is also apparent that all aliphatic terminators of this type give solution stability to this type of polymer. Jet lube resistance was still poor.

In still other examples, the polymers of Examples I and II were made with benzoyl chloride terminators. Solutions of these polymers gelled after several weeks, but polymer coatings subjected to the 500° F. air oven aging test for one week exhibited outstanding heat resistance and did not embrittle.

It is completely unexpected to find that an aromatic-type polymer, as in Example IV above, exhibits good initial clarity and lack of color, that it retains this property after 500° F. heat, sunlight, and general weathering exposure, and, in addition, retains essentially its other initial physical properties.

EXAMPLE V

A polymer was prepared as above, using the difunctional intermediates, along with a mono-functional terminator, in the molar proportions shown below.

14.8% terephthaloyl chloride
34.6% isophthaloyl chloride
1.0% benzoyl chloride
44.6% hexafluoroacetone Bisphenol A
5.0% Bisphenol A Chemically effective amounts of the Bisphenol A up to five molar percent were also used with improved results. Each of the polymers exhibited all of the outstanding properties of the polymer of Example IV. They had good Florida weathering resistance and did not discolor when aged in an air circulating oven for one week at 500° F. The solubility of each polymer in non-toxic paint solvents remained good, but their jet lube resistance, although improved, was not satisfactory. At temperatures between 500° to 600° F., they exhibited a slight degree of cross-linking.

EXAMPLE VI

A polymer was prepared as above, using the following difunctional intermediates, along with a terminator, in the molar proportions shown.

14.8% terephthaloyl chloride
34.6% isophthaloyl chloride
1.0% benzoyl chloride
39.6% hexafluoroacetone Bisphenol A
10.0% Bisphenol A The polymer exhibited all of the desirable properties of the polymer in Example V. In addition, coatings showed good resistance to aircraft jet fuels, and also to hot ester-type jet lubricants specified in Federal Specification MIL-L-23699.

At temperatures between 500° F. and 600° F., the polymer exhibited sufficient cross-linking to increase its high temperature capability from 500° to 570° F. for long periods of time. Polymers without Bisphenol A did not cross-link.

In related experiments, the Bisphenol A was used to replace the hexafluoroacetone Bisphenol A in 20% increments until total replacement occurred. In all cases, the excellent heat resistant characteristics of the polymer were maintained and cross-linking could be controlled as required with temperature, time and Bisphenol A content. In applications where discoloration resistance from weathering or heat was important, about 10% Bisphenol A was the maximum that could be used.

In still other related experiments where excellent heat resistance was required but where discoloration resistance from weathering or heat was not required, the hexafluoroacetone Bisphenol A was partially or totally replaced with other Bisphenols, 4,4'-dihydroxydiphenyl ether, 4,4'-dihydroxydiphenyl, 4,4'-dihydroxyphenol methane, or combinations of any of these.

EXAMPLE VII

A polymer was prepared as in Example VI above but with 7.5 molar percent Bisphenol A, as shown in the molar proportions below.

14.8% terephthaloyl chloride
34.6% isophthaloyl chloride
1.0% benzoyl chloride
42.1% hexafluoroacetone Bisphenol A
7.5% Bisphenol A The polymer exhibited all of the outstanding characteristics of the Example VI polymer, including jet lube resistance.

In similar experiments to the above example, it was determined that the ratio of iso-/terephthaloyl chloride could be varied from 95/5 to 60/40 and still give satisfactorily soluble polymers for high temperature paints with all of the outstanding characteristics of the above polymer of Example VII. The preferred ratio of iso-/terephthaloyl chloride, however, was 70/30 as used in Example VII.

In still other related experiments, using either essentially 50 molar percent hexafluoroacetone Bisphenol A or up to 20 molar percent replacement of the hexafluoroacetone Bisphenol A with Bisphenol A, it was further noted that these excellent weathering and heat resistant characteristics were maintained with the above type of polymer of Example VII, when the phthaloyl chloride intermediates used were all isophthaloyl chloride or all terephthaloyl, or any combination thereof. This was also true of the use of orthophthaloyl chloride although either or both of the other two phthaloyls were preferred in making polymer compositions.

EXAMPLE VIII

The following polymer was prepared as above, with intermediates in the molar proportions shown below.

14.8% 2,6 naphthaloyl chloride
34.6% isophthaloyl chloride
1.0% benzoyl chloride
49.6% hexafluoroacetone Bisphenol A The above polymer had outstanding heat and weathering resistance, similar to the polymer of Example IV. It was particularly noted and unexpected that this and other similar polymers containing the naphthalic unit were more more resistant to gamma radiation than those containing only the phthalic unit.

Polymers prepared using major proportions of 2,6 naphthaloyl chloride and also total replacement of all the phthaloyl chlorides with this intermediate, continued to exhibit outstanding heat and weathering resistance, and also as coatings, sheets, films, fibers, and other fabricated articles. This was true of these polymers also when they were prepared using essentially 50 molar percent hexafluoroacetone Bisphenol A or up to 20 molar percent of its replacement with Bisphenol A. Similar polymers made using greater than 20 molar percent to total replacement of the hexafluoroacetone Bisphenol A with Bisphenol A exhibited the outstanding heat resistance but not the weathering resistance.

EXAMPLE IX

This polymer was prepared as above, with the following difunctional intermediates, along with a terminator, in the molar proportions shown below.

14.8% bibenzoyl chloride
34.6% isophthaloyl chloride
1.0% benzoyl chloride
49.6% hexafluoroacetone Bisphenol A The polymer had outstanding heat and weathering resistance similar to the polymer of Example IV. Polymers prepared using major proportions of the bibenzoyl chloride and also total replacement of all the phthaloyl chlorides with this intermediate, continued to exhibit outstanding heat and Florida weathering resistance. This was true of these polymers also when they were prepared using essentially 50 molar percent hexafluoroacetone Bisphenol A or up to 20 molar percent of its replacement with Bisphenol A. Similar polymers prepared using greater than 20 molar percent to total replacement of the hexafluoroacetone Bisphenol A with Bisphenol A exhibited the outstanding heat resistance but not outstanding weathering resistance.

EXAMPLE X

This polymer was prepared with the following intermediates, in the molar proportions shown below.

14.8% oxydibenzoyl chloride
34.6% isophthaloyl chloride
1.0% benzoyl chloride
49.6% hexafluoroacetone Bisphenol A This polymer also had outstanding heat and weathering resistance similar to the polymer of Example IV. Polymers prepared using major proportions of oxydibenzoyl chloride and also total replacement of all the phthaloyl chlorides with this intermediate continued to exhibit outstanding heat and Florida weathering resistance. This was true of these polymers also when they were prepared using essentially 50 molar percent hexafluoroacetone Bisphenol A or up to 20 molar percent of its replacement with Bisphenol A. Related polymers prepared using greater than 20 molar percent to total replacement of the hexafluoroacetone Bisphenol A with Bisphenol A continued to exhibit the outstanding heat resistance but not the weathering resistance.

EXAMPLE XI

The polymer of Example VII was used in the following formulation to prepare an aircraft primer paint.

Primer
(a) Ingredient: Percent composition
Polymer _____ 40
Strontium chromate _____ 32
Titanium dioxide _____ 6
Talc _____ 14
Silica _____ 8

The polymer of Example VII was also used to formulate a gloss-white topcoat, in the following proportions.

Gloss-white topcoat
(b) Ingredient: Percent composition
Polymer _____ 65
Titanium dioxide _____ 35

The required solvents were added to the above (a) and (b) formulations and the ingredients were ball-milled for six days to give finished paints. The primer, followed by the topcoat were then spray-applied on aluminum, titanium, and stainless steel panels, which had first been given proper chemical pretreatments. After several days, air-drying at room temperature, the panels were placed in a circulating air oven at 500° F. for one week. Examination of panels after the test showed no discoloration on any panels. Coatings on aluminum panels were flexible and adhesion was good. Coatings on titanium and stainless steel were somewhat brittle and adhesion was only fair.

EXAMPLE XII

The polymer of Example VII was used in the following aircraft primer paint in the proportions shown below. It will be noted that this primer contained aluminum hydroxide.

Primer
(a) Ingredient: Percent composition
Polymer _____ 40
Titanium dioxide _____ 6
Aluminum hydroxide _____ 54

The polymer of Example VII was again used, to formulate a gloss-white topcoat, containing aluminum hydroxide, in the proportions shown below.

Gloss-white topcoat
(b) Ingredient: Percent composition
Polymer _____ 65
Titanium dioxide _____ 25
Aluminum hydroxide _____ 10

The required solvents were added to the above (a) and (b) formulations and the ingredients were ball-milled six days to give finished paints. The primer, followed by the topcoat were then spray-applied on aluminum, titanium, and stainless steel panels, which had first been given proper chemical pretreatments. After several days, air-drying at room temperature, the panels were placed in a circulating air oven at 500° F. for one week. Examination of the panels after this heat test showed no discoloration on any panels. Coatings on aluminum panels were quite flexible and adhesion was outstanding. The panels in all respects equalled original unaged panels. Coatings on the titanium and stainless steel panels were unexpectedly quite outstanding. They maintained their flexibility, had excellent adhesion, and in every way were equal to the original panels.

Original panels of the above coatings on aluminum, titanium and stainless steel unexpectedly had superior jet lube resistance to the coating compositions of Example XI which did not contain aluminum hydroxide.

In other experiments with primer compositions and topcoat compositions similar to the above, it was shown that beneficial effects are obtained in the primer and topcoat when the aluminum hydroxide replaces from 10% to 100% of the inorganic ingredients of the primer and topcoat.

What is claimed is:

1. A polyester product obtained from the reaction of essentially 50 molar percent of 4,4'-hexafluoroisopropylidene diphenol, essentially 50 molar percent of at least one of the chloride group consisting of isophthaloyl chloride, terephthaloyl chloride, naphthaloyl dichloride, dibenzoyl chloride, and oxydibenzoyl chloride, and between 1 and 2 molar percent of at least one mono-functional polymer terminator of the group consisting of benzoyl chloride, naphthaloyl chloride, p-phenyl phenol and carbamoyl chloride.

2. The polyester of claim 1 in which the chloride of the chloride group is composed of isophthaloyl and terephthaloyl chloride.

3. The polyester of claim 1 in which the chloride of the chloride group is composed of between 5 to 40% terephthaloyl chloride and between 60 to 95% isophthaloyl chloride.

4. The polyester of claim 1 in which the chloride of the chloride group is naphthaloyl dichloride.

5. The polyester of claim 1 in which the chloride of the chloride group is bibenzoyl chloride.

6. The polyester of claim 1 in which the chloride of the chloride group is oxydibenzoyl chloride.

References Cited

UNITED STATES PATENTS

| | | | |
|---|---|---|---|
| 3,388,097 | 6/1968 | Cramer | 260—47 |
| 3,160,602 | 12/1964 | Kantor et al. | 260—47 |
| 3,216,970 | 11/1965 | Conix | 260—47 |
| 3,317,464 | 5/1967 | Conix | 260—47 |

LESTER L. LEE, Primary Examiner

U.S. Cl. X.R.

117—132 R, 161 K; 260—31.2 XA, 32.8 R, 33.2 R, 33.6 R, 33.8 R, 47 C